United States Patent
Park

(10) Patent No.: US 11,488,587 B2
(45) Date of Patent: Nov. 1, 2022

(54) REGIONAL FEATURES BASED SPEECH RECOGNITION METHOD AND SYSTEM

(71) Applicant: LG ELECTRONICS INC., Seoul (KR)

(72) Inventor: Seonyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 16/823,166

(22) Filed: Mar. 18, 2020

(65) Prior Publication Data

US 2021/0210081 A1    Jul. 8, 2021

(30) Foreign Application Priority Data

Jan. 3, 2020    (KR) ........................ 10-2020-0000957

(51) Int. Cl.
*G10L 15/197*    (2013.01)
*G10L 15/02*     (2006.01)
*G10L 15/06*     (2013.01)
*G10L 15/22*     (2006.01)

(52) U.S. Cl.
CPC ............ *G10L 15/197* (2013.01); *G10L 15/02* (2013.01); *G10L 15/063* (2013.01); *G10L 15/22* (2013.01)

(58) Field of Classification Search
CPC ..... G10L 15/197; G10L 15/02; G10L 15/063; G10L 15/22
See application file for complete search history.

(56) References Cited

U.S. PATENT DOCUMENTS

| | | | | |
|---|---|---|---|---|
| 9,009,049 B2* | 4/2015 | Liu | .................. | G10L 15/32 |
| | | | | 704/251 |
| 10,290,300 B2* | 5/2019 | Pashine | ................. | G10L 15/02 |
| 10,388,272 B1* | 8/2019 | Thomson | ............... | G10L 15/22 |
| 10,950,239 B2* | 3/2021 | Lin | .................. | G10L 15/30 |
| 2005/0154596 A1* | 7/2005 | Mochary | ............... | G10L 15/26 |
| | | | | 704/E15.044 |
| 2008/0010605 A1* | 1/2008 | Frank | .................. | G06F 16/29 |
| | | | | 715/765 |
| 2011/0060587 A1* | 3/2011 | Phillips | ................. | G10L 15/30 |
| | | | | 704/235 |
| 2014/0129218 A1* | 5/2014 | Liu | .................. | G10L 15/32 |
| | | | | 704/E15.001 |
| 2017/0206890 A1* | 7/2017 | Tapuhi | ................. | G06F 40/232 |
| 2018/0308487 A1* | 10/2018 | Goel | .................. | G10L 15/1815 |
| 2021/0174783 A1* | 6/2021 | Wieman | ................ | G10L 15/063 |
| 2021/0174806 A1* | 6/2021 | Krishnaswamy | ....... | G10L 15/16 |

FOREIGN PATENT DOCUMENTS

| KR | 10-1836430 B1 | 3/2018 |
|---|---|---|
| KR | 10-2018-0114781 A | 10/2018 |

* cited by examiner

*Primary Examiner* — Michael Colucci
(74) *Attorney, Agent, or Firm* — Birch, Stewart, Kolasch & Birch, LLP

(57) ABSTRACT

Disclosed is a regional-features-based speech recognition method, including learning speech features by region using speech data classified by region category, and recognizing input speech using an acoustic model and a language model generated through classification of a region category for the input speech and the learning. A user may use a dialect recognition service that is improved using learning based on artificial intelligence (AI) and enhanced mobile broadband (eMBB), ultra-reliable and low latency communications (URLLC), and massive machine-type communications (mMTC) techniques of 5G mobile communication.

12 Claims, 6 Drawing Sheets

REGIONAL FEATURES BASED SPEECH RECOGNITION METHOD AND SYSTEM

CROSS-REFERENCE TO RELATED APPLICATION

This present application claims benefit of priority to Korean Patent Application No. 10-2020-0000957, entitled "REGIONAL FEATURES BASED SPEECH RECOGNITION METHOD AND SYSTEM," filed on Jan. 3, 2020, in the Korean Intellectual Property Office, the entire disclosure of which is incorporated herein by reference.

BACKGROUND

1. Technical Field

The present disclosure relates to a regional-features-based speech recognition method and system, and more particularly to a speech recognition method including language modeling for improving recognition of speech in different accents and vocabulary characteristics by region and a speech recognition system including a language modeling device.

2. Description of Related Art

The concept of speech recognition includes the recognition, analysis, and understanding of speech uttered by a person during a conversation between the person and a machine, and various techniques have been used for speech recognition.

The speech recognition process is largely composed of three stages. First, from inputted speech, features of speech actually uttered by a person are extracted. Then, based on the extracted features of the speech, patterns are classified through a similarity measurement with a reference acoustic model. Thereafter, within the classified patterns, by using a reference language model, the features of the speech are processed as a language, and recognized as a final sentence.

Dialects of a language generally refer to variations of that language depending on geographical regions and social factors. Regional dialects are a valuable cultural heritage having a unique system and history, showing the diversity of a language. In linguistics, dialects illustrate both the change and the history of a language and the lives of people in the region in which a regional dialect is spoken, which are projected onto the language in terms of cultural values. Moreover, dialects are still used by people in certain geographical regions, along with a standard language.

Since a speech recognition system recognizing speech uttered in a particular language is created based on the standard language of the corresponding language, the capability to recognize a regional dialect, that is, a dialect, is significantly reduced.

Related art connected with a method of recognizing and translating speech including dialect speech is disclosed. According to the related art, tone noise is removed from uttered speech mixed with dialect speech, and dialect data are converted into standard language data, whereby the dialect speech is converted into a standard language. In the related art, however, it is unclear as to how the uttered speech mixed with dialect speech is recognized, and whether dialect speech is recognized only through conversion of a tone and vocabulary.

In addition, related art connected to a method and device for converting a dialect into a standard language is disclosed. According to the related art, words common to the dialect and the standard language may be replaced by predetermined keywords, whereby a standard language sentence may be acquired from a dialect sentence. However, since common words are used rather than the features of the dialect that are distinguished from the standard language, persuasive power is low.

In the related art described above, there is an error in which a regional language having regional features, such as a dialect or a regional dialect, is converted into and recognized as a standard language without being based on a language model having linguistic features of a regional dialect.

SUMMARY OF THE PRESENT DISCLOSURE

An aspect of the present disclosure is to address an issue associated with some related art in which speech having regional features is recognized by being converted into a standard language.

Another aspect of the present disclosure is to address an issue associated with some related art in which dialect speech is recognized using a standard-language-based language model.

A further aspect of the present disclosure is to provide a system capable of recognizing speech including regional characteristics related to accent and vocabulary using an acoustic and language model constructed based thereon.

While this disclosure includes specific embodiments, it will be apparent to one of ordinary skill in the art that various changes in form and details may be made in these embodiments without departing from the spirit and scope of claims and their equivalents. The embodiments described herein are to be considered in a descriptive sense only, and not for purposes of limitation. Further, it is to be understood that the aspects and advantages of the present disclosure may be embodied by the means and a combination thereof in claims.

A regional-features-based speech recognition method according to an embodiment of the present disclosure may be configured to include learning speech features by region using speech data classified by region category, and recognizing input speech using an acoustic model and a language model generated through classification of a region category for the input speech and the learning.

In addition, the learning speech features by region may include classifying speech features by region category based on accent.

In addition, the learning speech features by region may include generating a region classification learning model using extracted speech features.

In addition, the learning speech features by region may further include training the acoustic model using the classified speech features.

In addition, the learning speech features by region may further include training the language model based on a corpus collected by region.

In addition, the training the language model may include performing region information vector labeling by word with respect to the words included in the corpus collected by region.

In addition, the training the language model may include performing vector labeling in which, with respect to a word frequently used by region, the value of information of a corresponding region is set to be high.

In addition, the recognizing the input speech may include recognizing the input speech using by-region speech recognizers using the acoustic model and by-region language models, predicting a region category to which the input speech belongs using an accent of the input speech, a characteristic word by region, and the number of times that the word is used in a speech recognition process, and selecting output of a region category speech recognizer that has received a highest score according to the prediction.

In addition, the recognizing the input speech may be performed in parallel by the by-region speech recognizers.

In addition, the predicting a region category may include ranking the outputs of the by-region speech recognizers based on an accent of the input speech, a word included in the input speech and having regional characteristics, and the number of times that the word is used.

A regional-features-based speech recognition system according to another embodiment of the present disclosure may be configured to include a learning module configured to learn speech features by region using speech data classified by region category, and a speech recognizer configured to recognize input speech using an acoustic model and a language model generated through classification of a region category for the input speech and the learning.

In addition, the learning module may include a region classification learning module configured to classify speech features by region category based on accent.

In addition, the region classification learning module may generate a region classifier configured to classify speech features extracted by region category based on accent.

In addition, the learning module may further include an acoustic model learning module configured to train the acoustic model using the classified speech features.

In addition, the learning module may further include a language model learning module configured to train the language model based on a corpus collected by region.

In addition, the language model learning module may perform region information vector labeling by word with respect to the words included in the corpus collected by region.

In addition, the language model learning module may perform vector labeling in which, with respect to a word frequently used by region, the value of information of a corresponding region is set to be high.

In addition, the speech recognition system may recognize the input speech using by-region speech recognizers using the acoustic model and by-region language models, may predict a region category to which the input speech belongs using an accent of the input speech, a word having regional characteristics, and the number of times that the word is used in a speech recognition process, and may select the output of a region category speech recognizer that has received a highest score according to the prediction.

In addition, the speech recognizer may include by-region speech recognizers that recognize speech in parallel.

In addition, the regional-features-based speech recognition system may rank the outputs of by-region speech recognizers using a region classification result probability vector based on an accent of the input speech, a word included in the input speech and having regional characteristics, and the number of times that the word is used, a region information probability vector by word having regional characteristics, and a scalar value of the number of times.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
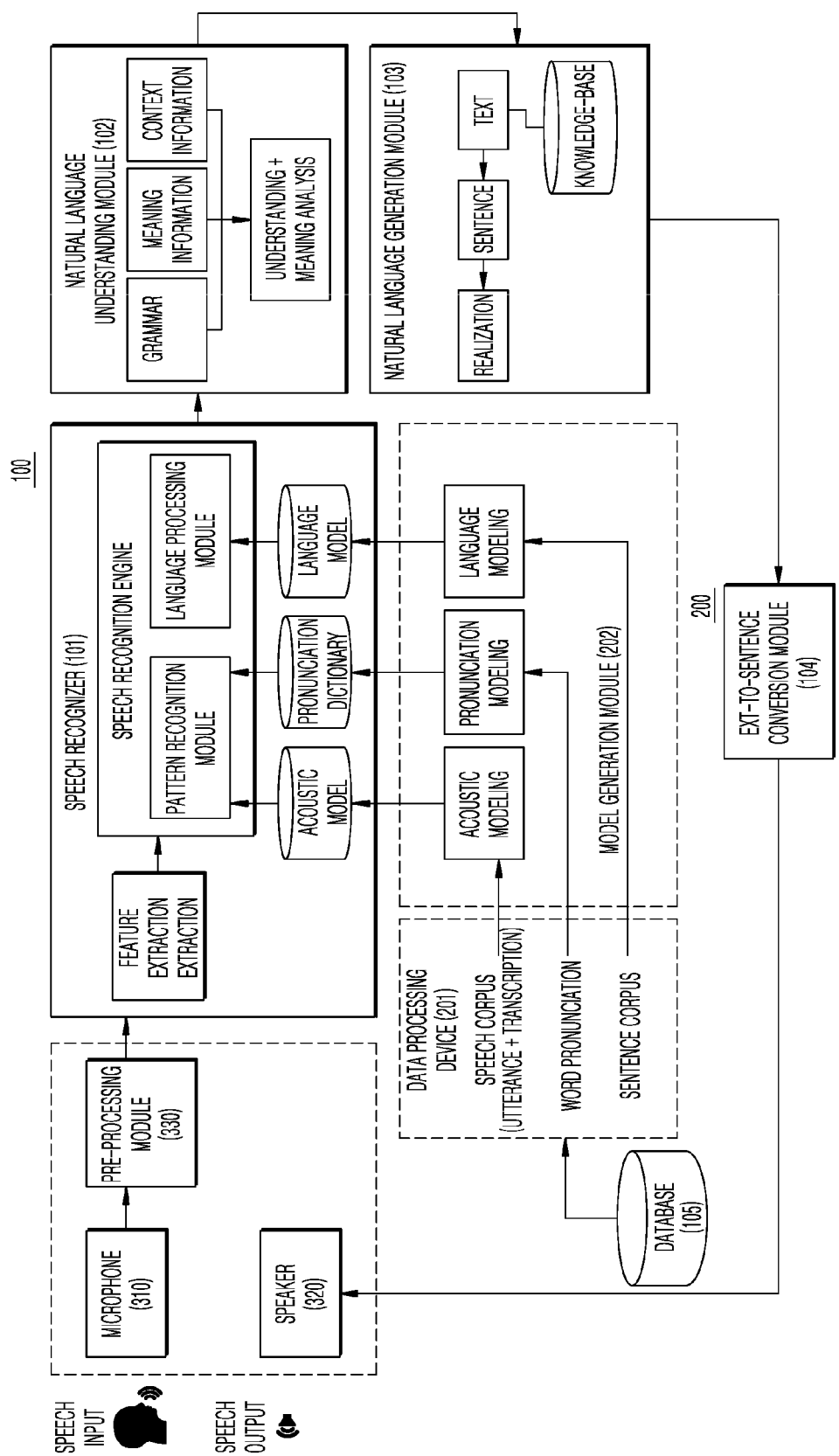
FIG. 1 is a block diagram of a speech recognition system.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. In relation to describing the present disclosure, when the detailed description of the relevant known technology is determined to unnecessarily obscure the gist of the present disclosure, the detailed description may be omitted. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is a block diagram of a speech recognition system.

Referring to FIG. 1, an speech recognizer (SR) 101 is illustrated. The SR 101 may be configured to include a speech recognition engine, an acoustic model, a pronunciation dictionary 130, and a language model.

Uttered speech is converted into an analog signal through a microphone, and then the analog signal is converted into a digital signal through a digital sampling process. The digital signal is subjected to acoustic signal processing. Here, the acoustic signal processing may include spectral analysis.

Regional dialect speech is inputted through the smart electronic device 300 (for example, an AI speaker 302) and the inputted speech is converted into an analog signal, and the converted analog signal is converted into a digital signal through sampling. The speech recognition engine extracts the features of speech, i.e. a feature vector, from the digital signal. In addition, the speech recognition engine generates a candidate unit through a pattern recognition process using a phoneme adaptive model 120 and the pronunciation dictionary 130 based on the extracted feature vector, and outputs a finally recognized sentence through a language processing process using the pronunciation dictionary 130 and the language model.

The SR 101 recognizes elements of a sentence, such as phonemes, syllables, and words based on features of a speech signal, expressed as a simple number, by way of example, in a pattern recognition process. In addition, the SR 101 reconstructs the elements of a sentence to restore a sentence in a language processing process, which is a post-processing process. In the pattern recognition process, theoretical knowledge of phonetics, phonology, phonotactics, and prosody may be used. Meanwhile, in the language processing process (the post-processing process), theoretical knowledge of syntax, semantics, and morphology may be used.

Even in the same language, speech not only varies in significantly complicated ways depending on factors such as the gender, age, and state during pronunciation of the person uttering the speech, but the character of the speech also varies depending on whether the speech is uttered alone or within a word or a sentence. That is, in a feature extracting process, unnecessarily duplicated speech information should be removed, while information that increases consistency between the same speech signals and increasing a distinction with other speech signals is extracted. Such information is called a feature vector.

Feature extraction is a process of extracting components useful for recognition from a speech signal. The feature extraction generally relates to data compression and dimensionality reduction processes. Since there is no ideal method for feature extraction, a speech recognition rate is used to determine the degree of quality of the features for speech recognition. The main research fields regarding feature extraction are an expression of a feature reflecting a human auditory feature, an extraction of a feature robust to various noise environments/speakers/channel changes, and an extraction of a feature expressing a change of time.

Feature extraction techniques of input speech, required for speech recognition, are a linear predictive coefficient, cepstrum, a mel-frequency cepstral coefficient (MFCC), and a filter bank energy.

In the speech recognition process, research on pattern recognition algorithms has been most actively conducted. As types of pattern recognition algorithms, dynamic time warping (DTW), hidden Markov modeling (HMM), knowledge base systems, and artificial neural networks are provided. Here, the DTW uses dynamic programming, the HMM uses a probability estimation, the knowledge based systems use an inference using an artificial intelligence, and the artificial neural networks use a function of pattern recognition, to solve the same problem using different methods.

A regional-features-based speech recognition system 500 according to an embodiment of the present disclosure may apply deep learning, which is a kind of artificial intelligence algorithm, to recognize the pattern of speech in the speech recognition process.

For example, in an artificial neural network in which a Gaussian mixture model (GMM) used for modeling each state probability distribution of HMM is replaced with a deep neural network (DNN), a method in which DNN and HMM are combined with each other may be used.

In speech recognition using DNN-HMM, DNN is applied to calculate state probability from a speech feature vector. Input of DNN is provided as a speech feature vector of about ten frames, while output of DNN is provided as respective state probabilities of all triphones used as a unit in HMM. According to a model parameter for each layer of DNN trained by inputting a feature vector string, obtained from the about ten frames, a state probability value of a triphone is obtained in a final output. By using the state probability value, a recognition result of the registered lexical unit is searched.

In an image recognition field, a convolutional neural network has excellent performance. However, in a time series data field, the convolutional neural network faces difficulties. In the time series data field, such as in speech recognition, language translation, and natural language processing, a recurrent neural network (RNN) may be used. In the case of a recurrent neural network, a sequence having an arbitrary length may be processed, rather than fixed length input.

The recurrent neural network has a structure in which output is returned to save a state of a hidden layer, rather than a structure in which output is returned to input as is the case in an associative memory. The meaning of "recurrent" refers to repetition, and the recurrent neural network has a structure in which a specific part is repeated. Compared with a neural network according to the related art, in the recurrent neural network, a hidden layer neuron includes a recurrent weight, returning to itself. The recurrent weight has a function of remembering information on past data, so the recurrent neural network may use a past memory when new data is processed.

Language processing algorithms include syntactic rule models and statistical models. A syntactic rule method is a method in which a sentence is constituted by restricting a type of word which follows each word according to a syntactic rule.

Meanwhile, in a statistical model, represented by an N-gram, a sentence is recognized in consideration of the probability of occurrence of the N number of previous words with respect to each word.

The speech recognition process is divided into an offline training stage in which a recognition network model is generated from speech data and language data and an online search stage in which speech uttered by the user is recognized.

The speech recognition engine outputs text information from a speech signal using important knowledge as phonetic and linguistic information, i.e. the acoustic model and the language model, and the pronunciation dictionary in addition thereto. In this case, a speech recognition algorithm may be referred to as a decoder, in that a speech signal is interpreted as character symbols.

The feature vector, obtained in the feature extraction, is subjected to a similarity measurement and a recognition process. For similarity measurement and recognition, an acoustic model for modeling and comparing signal characteristics of speech is used. In detail, the acoustic model used therefor includes a acoustic model for adaption to phonemes of regional dialect speech and a language model 140 modeling a linguistic order relation of words or syllables, corresponding to a recognition vocabulary.

The acoustic model is again divided into a direct comparison method and a statistical method. In the direct comparison method, a recognition target is set as a feature vector model, and the feature vector model is compared with a feature vector of an input signal. In the statistical method, feature vectors of a recognition target are statistically processed and used. In the direct comparison method, a unit such as a word or a phoneme, provided as a recognition target, is set as a feature vector model, and inputted speech is compared with the feature vector model to obtain a degree of similarity therebetween. The representative direct comparison method is a method using vector quantization. Here, the previously obtained feature vector or coefficients are mapped to a codebook, which is an existing model, and encoded into a representative value, and code values are thereby compared with each other.

In the statistical method, a unit for a recognition target is provided as a state sequence, and the relationship between state sequences is used. The state sequence can construct a complex model, and thus this technique is used for most speech recognition, excluding simple word recognition. The method using the relationship between state sequences is again divided into a method using a temporal arrangement relationship such as dynamic time warping (DTW), a statistical method such as hidden Markov modeling (HMM) in which the probability, mean, and variance are provided as comparison targets, and a method using an artificial neural network.

In the decoding, by using the acoustic model (AM), the language model (LM), and the pronunciation lexicon, resulting from the training stage, the inputted feature vector is compared with a model and scored, and a word sequence is ultimately determined.

A database 105 may be configured to include user log data including dialect data by region collected from various kinds of electronic devices 300 through a domain that provides a speech recognition service and public speech data constructed by a state or research institute. In addition, the database 105 may be configured to include big data.

The speech recognition system 100 recognizes speech using a preprocessed speech signal, inputted through a microphone 301 included in an electronic device 300, understands the contents of the speech based on recognized text, generates natural language based on the understood contents, and synthesizes speech, which can be outputted through a speaker 302, using generated text.

The speech recognition system 100 may be configured to include modules respectively performing a series of processes from input to output of speech, and the modules may include the SR 101, a natural language understanding (NLU) module 102, a natural language generation (NLG) module 103, and a text-to-sentence conversion (TTS) module 104. Here, components constituting the speech recognition system 100 may be provided as one server, or each component may be provided as one or more servers.

Referring again to FIG. 1, while speech recognition processes are performed by the SR 101 to the TTS module 104 in an online stage, various model training processes, required for data collection, processing, and speech recognition using the same, are performed by the data processing device 201 and the model generation module 202 in an offline stage.

Figure 2:
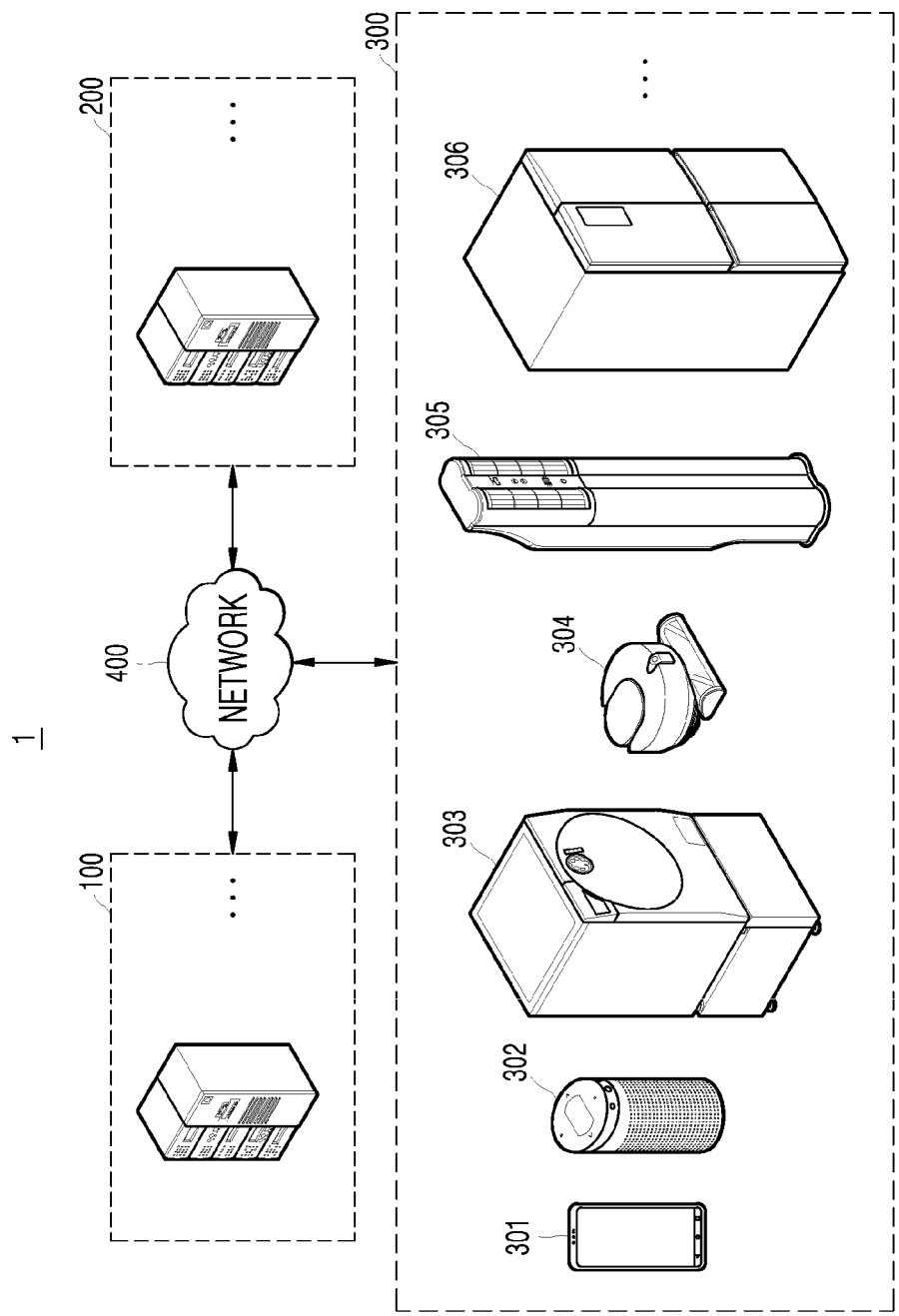
FIG. 2 is an illustrative diagram of a network environment including a speech recognition system.

FIG. 2 is an illustrative diagram of a network environment including a speech recognition system.

Referring to FIG. 2, a speech recognition system 100, a learning system 200, various kinds of smart electronic devices 300 controllable through a speech interface, and a network 400 that connects the speech recognition system 100, the learning system 200, and the smart electronic devices 300 to each other such that communication therebetween is possible.

The speech recognition system 100 is a system that recognizes various kinds of speech and outputs the result of processing in the form of language and text through a natural language processing process based on the recognized speech, i.e. a system that performs composite functions.

The speech recognition system 100 may provide a speech recognition service to the smart electronic devices 300 through various kinds of speech recognition service domains. Here, the speech recognition service is not limited to recognizing speech of a person, but may include an artificial intelligent assistant function through natural language processing and an electronic device control service through a speech interface.

The speech recognition system 100 may be configured to perform the entirety of a speech recognition process including speech recognition, natural language understanding, natural language generation, and speech synthesis. The speech recognition system 100 may be configured in the form of a single server such as a computing device, or may be configured as one or more servers with respect to each of speech recognition, natural language understanding, natural language generation, and speech synthesis.

The learning system 200 is a system that processes data including dialect speech and trains a model necessary for dialect recognition using the processed data.

Alternatively, the learning system 200 may collect speech of the user through a corresponding domain, for example, speech data including dialect speech. That is, the learning system 200 may collect speech data through the user log data. In addition, the regional dialect-containing speech data collected from each domain (that is, dialect data) may be used as training data, which enables training of an acoustic model and a language model. In particular, various types of information on a corresponding domain, and region information of the electronic device 300, may be used to guide classifying regional dialect data by region.

The learning system 200 may collect dialect data having features distinguished by domain or by region. Through the network access address of a smart electronic device 300 that transmits the dialect data to a server of the speech recognition system 100 or hardware information thereof, the region in which the smart electronic device 300 is located may be grasped. Thus, pieces of dialect speech data of different regions, such as Gyeonggi Province, Jeolla Province, Gyeongsang Province, Chungcheong Province, Gangwon Province, and Jeju Island, are sorted by region and collected.

The electronic device 300 includes a speech input/output interface, and may be configured to include an embedded system enabling communication via Internet of Things (IoT). As an example of the electronic device 300, various IoT-enabled electronic devices 300 may be provided, such as a user terminal 301 performing an artificial intelligent assistant function, an artificial intelligent speaker 302 serving as a hub for connecting other electronic devices 300 to the network 400, a robot cleaner 304, an air conditioner 305, and a refrigerator 306. However, examples of the electronic device 300 are not limited to those illustrated in FIG. 1.

The electronic devices 300 may be connected to the speech recognition system 100 through a corresponding domain in order to use a speech recognition service. The representative speech recognition service, provided through the user terminal 301, is an artificial intelligence (AI) secretary function performed by an application. The artificial intelligent speaker 302, as a speaker having an agent function using an artificial intelligence (AI) algorithm, may serve as a hub controlling an electronic device without a speech input/output function. Apart from the above electronic devices, a voice input/output function is accommodated other electronic devices, such as household electrical appliances 303 to 306, so that the user can control electronic products using a voice interface. In this regard, the electronic devices 300 are referred to as smart electronic devices The network 400 may be a wired or wireless network, for example, a local area network (LAN), a wide area network (WAN), the Internet, and intranet and extranet, a mobile network, for example, cellular, 3G, 4G LTE, and 5G, a Wi-Fi network, and an ad-hoc network, and any suitable communications network including combinations thereof.

The network 400 may include connection of network elements such as hubs, bridges, routers, switches, and gateways. The network 400 may include one or more connected networks, including a public network such as Internet and a private network such as a secure corporate private network, for example, a multiple network environment.

Access to the network 400 can be provided via one or more wired or wireless access networks.

Various smart electronic devices 300 may transmit and receive data with the regional dialect phoneme adaptive training system 200 through a 5G network. In detail, the smart electronic device 300 may perform data communications with the regional dialect phoneme adaptive training system 200 using at least one among enhanced mobile broadband (eMBB), ultra-reliable and low latency communications (URLLC), and massive machine-type communications (mMTC) through a 5G network.

eMBB is a mobile broadband service, and provides, for example, multimedia contents and wireless data access. In addition, more improved mobile services such as a hotspot and a wideband coverage for receiving mobile traffic that are tremendously increasing may be provided through eMBB. Through a hotspot, high-volume traffic may be accommodated in an area where user mobility is low and user density is high. A wide and stable wireless environment and user mobility can be secured by a wideband coverage.

The URLLC service defines requirements that are far more stringent than existing LTE in terms of reliability and transmission delay of data transmission and reception, and corresponds to a 5G service for production process automation in fields such as industrial fields, telemedicine, remote surgery, transportation, safety, and the like.

mMTC is a service that is not sensitive to transmission delay requiring a relatively small amount of data transmission. mMTC enables a much larger number of terminals, such as sensors, than general mobile cellular phones to be simultaneously connected to a wireless access network. In this case, the price of the communication module of a terminal should be low and a technology improved to increase power efficiency and save power is required to enable operation for several years without replacing or recharging a battery.

An intelligent virtual assistant is a software agent processing a task requested by a user like a personal assistant, and providing a user-specific service. Recent intelligent virtual assistants provide customized information to a user based on artificial intelligence engines and speech recognition, and perform various functions such as schedule management, e-mail transmission, and restaurant reservation, depending on a speech command of the user.

The types of services provided by intelligent virtual assistants implemented as a so-called smart speaker include controlling an electronic device, providing information such as weather, and chatting, but the range of the services is gradually widening.

Among various speech recognition-related services provided by the smart speaker, services related to elderly people living alone have grown in importance. A smart speaker may be used as a device for managing the health and welfare of a growing number of elderly people living alone. Through conversation and monitoring functions, a smart speaker can sometimes act as a welfare officer, sometimes as a counselor, and sometimes as emergency and/or first aid guidance. However, since dialects with strong regional characteristics are widely used by elderly people living alone, it may be difficult to recognize a state of the elderly people living alone through speech recognition using a smart speaker.

Among the regional dialects in Korea, Gyeongsang Province dialect, Jeolla Province dialect, and Chungcheong Province dialect are most widely used. Moreover, among the dialects, the frequency of use of a spoken language dialect in communication between interlocutors increases in proportion to age. The present disclosure relates to a regional-features-based speech recognition method and speech recognition system capable of recognizing speech having regional features, e.g. a dialect, in a speech recognition service that can be provided through an input/output interface for speech recognition that can be embodied in various electronic devices, such as a user terminal and a smart speaker, in the form of a module.

Figure 3:
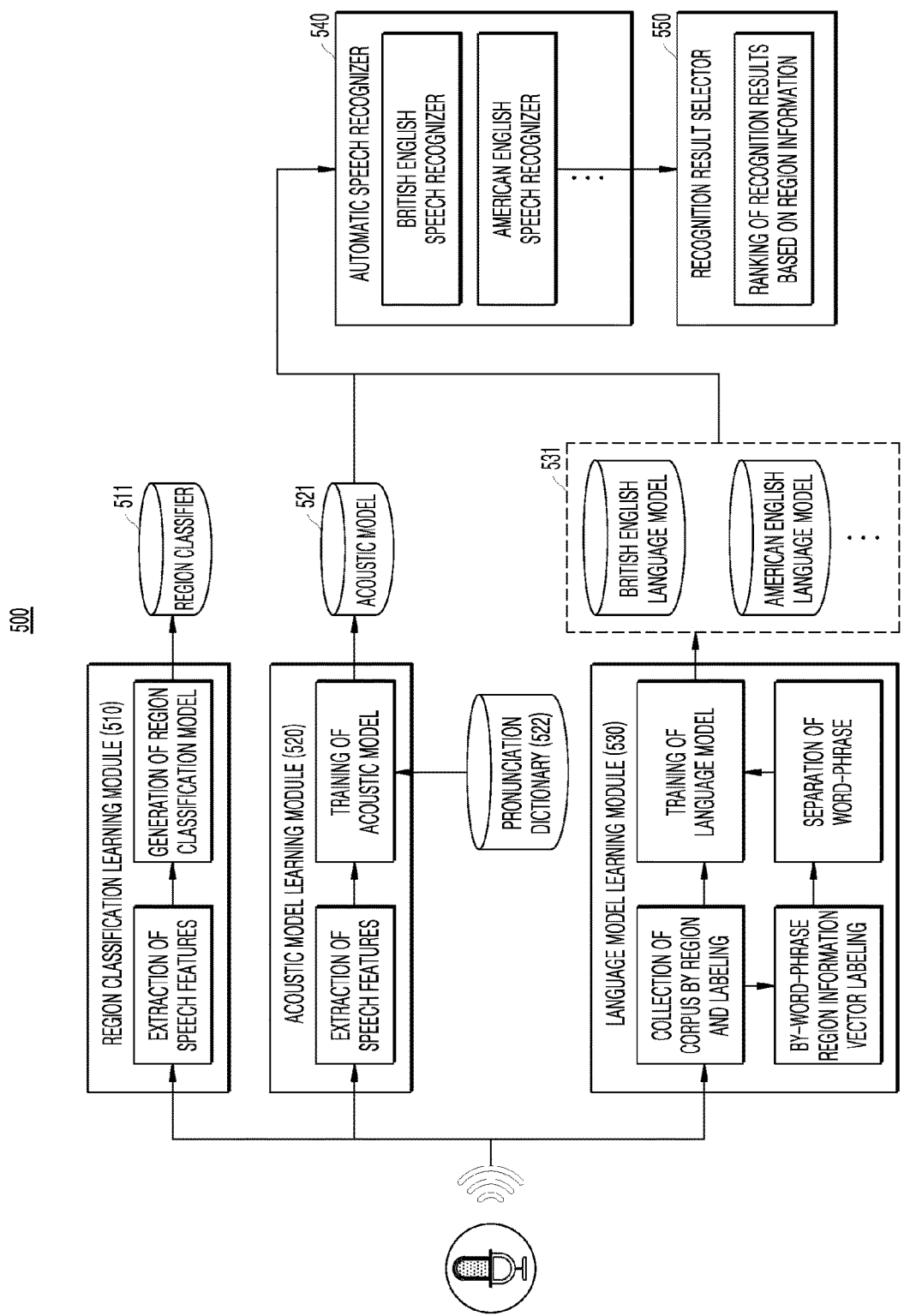
FIG. 3 is a block diagram of a speech recognition system according to an embodiment of the present disclosure.

FIG. 3 is a block diagram of a speech recognition system according to an embodiment of the present disclosure.

Referring to FIG. 3, a regional-features-based speech recognition system according to an embodiment of the present disclosure (hereinafter referred to as a "speech recognition system") 500 is illustrated. The speech recognition system 500 may be configured to include learning modules 510, 520, and 530 for learning speech features by region using speech data classified by region category and a speech recognizer 540 for recognizing input speech using an acoustic model 521 and a language model 531 generated through learning.

The learning modules may be configured to include a region classification learning module 510, an acoustic model learning module 520, and a language model learning module 530.

The region classification learning module 510 may perform a function of classifying speech features by region category based on accent. The region classification learning module 510 may generate a region classifier configured to classify speech features extracted by region category based on accent.

The acoustic model learning module 520 may perform a function of training the acoustic model using the classified speech features.

The language model learning module 530 may perform a function of training the language model based on a corpus collected by region.

The language model learning module 530 may perform region information vector labeling by word with respect to the words included in the corpus collected by region.

The language model learning module 530 may perform vector labeling in which, with respect to words frequently used by region, the value of information of a corresponding region is set to be high.

The speech recognizer 540 may recognize input speech using by-region speech recognizers 540 using the acoustic model 521 and the language model 531, and, in the speech recognition process, may select the output of a region category speech recognizer that receives the highest score through prediction of a region category to which the input speech belongs using an accent of the input speech, characteristic words by region, and the number of times that the words are used (550).

The speech recognizer 540 may be configured to include by-region speech recognizers that recognize speech in parallel.

The speech recognition system 500 may rank the outputs of the by-region speech recognizers based on an accent of the input speech, words that are included in the input speech and used regionally and characteristically, and the number of times that the words are used.

Figure 4:
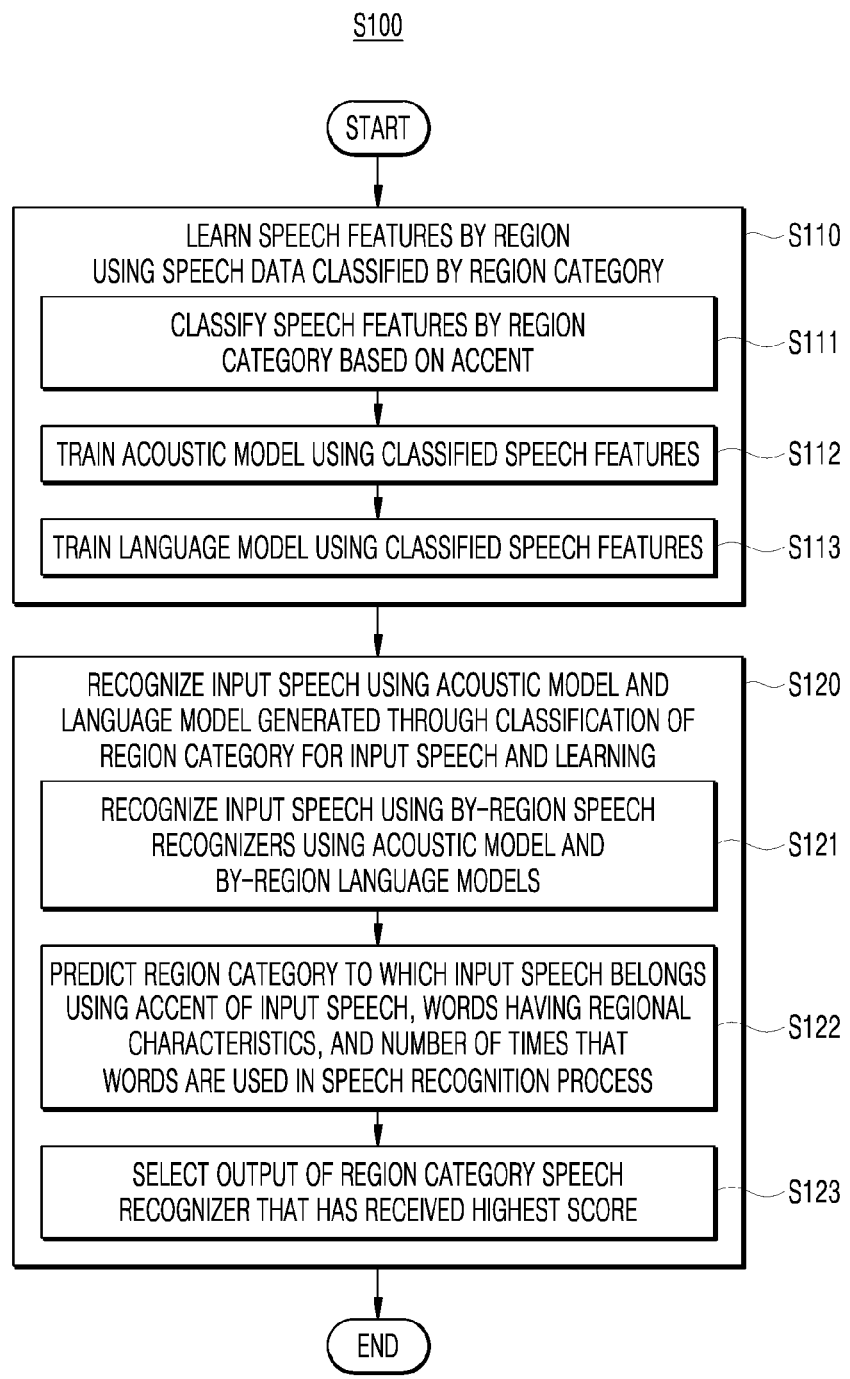
FIG. 4 is a flowchart of a speech recognition method according to an embodiment of the present disclosure.

FIG. 4 is a flowchart of a speech recognition method according to an embodiment of the present disclosure.

Referring to FIG. 4, a regional-features-based speech recognition method (S100) according to an embodiment of the present disclosure may be configured to include learning speech features by region using speech data classified by region category (S110), and recognizing input speech using an acoustic model and a language model generated through classification of a region category for the input speech and the learning (S120).

Step S110 may be configured to include classifying speech data by region category based on accent (S111), training an acoustic model using the classified speech data (S112), and training a language model using a corpus collected by region (S113).

Step S120 may be configured to include recognizing input speech using by-region speech recognizers using the acoustic model and by-region language models (S121), predicting a region category to which the input speech belongs using an accent of the input speech, characteristic words by region, and the number of times that the words are used in the speech recognition process (S122), and selecting the output of a region category speech recognizer that has received the highest score (S123).

Figure 5:
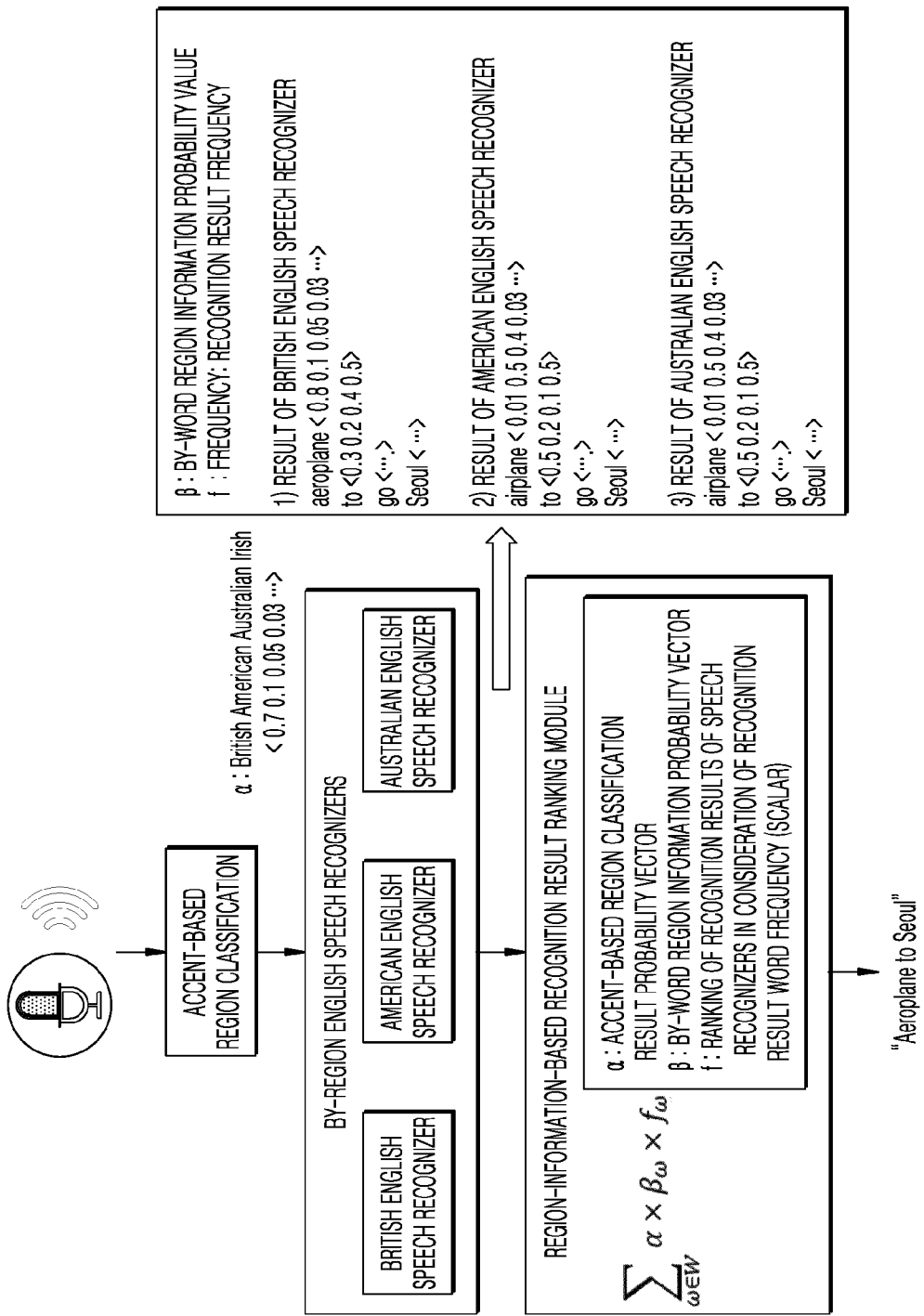
FIG. 5 is an illustrative diagram of a speech recognition method according to another embodiment of the present disclosure.

FIG. 5 is an illustrative diagram of a speech recognition method according to another embodiment of the present disclosure.

Referring to FIG. 5, a speech recognition method using by-region English speech recognizers is illustrated. Through a region classifier 511, the speech recognition system 500 may classify the region of input speech based on accent. The case in which "Aeroplane to Seoul" is inputted as input speech is assumed. The word "aeroplane" is mainly used in British English. Therefore, there is a high possibility of the sentence "Aeroplane to Seoul" being uttered in a British English accent. In this case, the region classifier 511 may predict a region based on the accent of the input speech under conditions of a probability of the input speech being British English of 0.7, a probability of the input speech being American English of 0.1, a probability of the input speech being Australian English of 0.05, and a probability of the input speech being Irish English of 0.03

The speech recognition system 500 may recognize input speech in parallel using the by-region English speech recognizers. A speech recognition system 500 according to an embodiment of the present disclosure drives a plurality of by-region English speech recognizers in parallel with respect to input speech in order to perform speech recognition. For English speech recognition, a British English speech recognizer, an American English speech recognizer, an Australian English speech recognizer, and an Irish English speech recognizer may be provided. Each English speech recognizer may use a language model constructed based on a corpus including vocabulary that is characteristically used in the region.

Since the word "aeroplane" is included in the input speech, the British English speech recognizer may assign 0.8 as a region information probability vector value about the word "aeroplane" in the input speech. A probability value of 0.8 is higher than 0.01, which is a value assigned by another region English speech recognizer.

The speech recognition system 500 may rank region-information-based recognition results through a recognition result selector 550. An accent-based region classification result probability vector, a region information probability vector based on words having regional characteristics included in speech, and the number of words having regional characteristics included in speech may be used as variables in a region-information-based recognition result ranking module.

Finally, the speech recognition system 500 may select the result of speech recognition by a speech recognizer that has received the highest score through the recognition result selector 550. Since the input speech is uttered in a British accent and the word having British type regional characteristics, "aeroplane," is included in the speech, the British English speech recognizer may assign a higher region classification result probability vector and a higher region information probability vector value to the input speech than the other region English speech recognizers. As a result, the result of speech recognition by the British English speech recognizer may be selected by the ranking module.

When predicting a region based on accent and words that are used, the distinction between British English, American English, Australian English, and Irish English is not decisively clear. That is, British English, American English, Australian English, and Irish English may be mixed in input speech depending on the environment in which the speaker grew up. In an embodiment of the present disclosure, therefore, the result of recognition based on region information may be ranked using a region classification result probability vector based on accent, a region information probability vector based on words having regional characteristics, and the number of times that words are used. As an extreme example, in the case in which 34% of British English, 33% of American English, and 33% of Australian English are mixed in input speech, the result of the British English speech recognizer, among the results of the English speech recognizers, may be selected.

Figure 6:
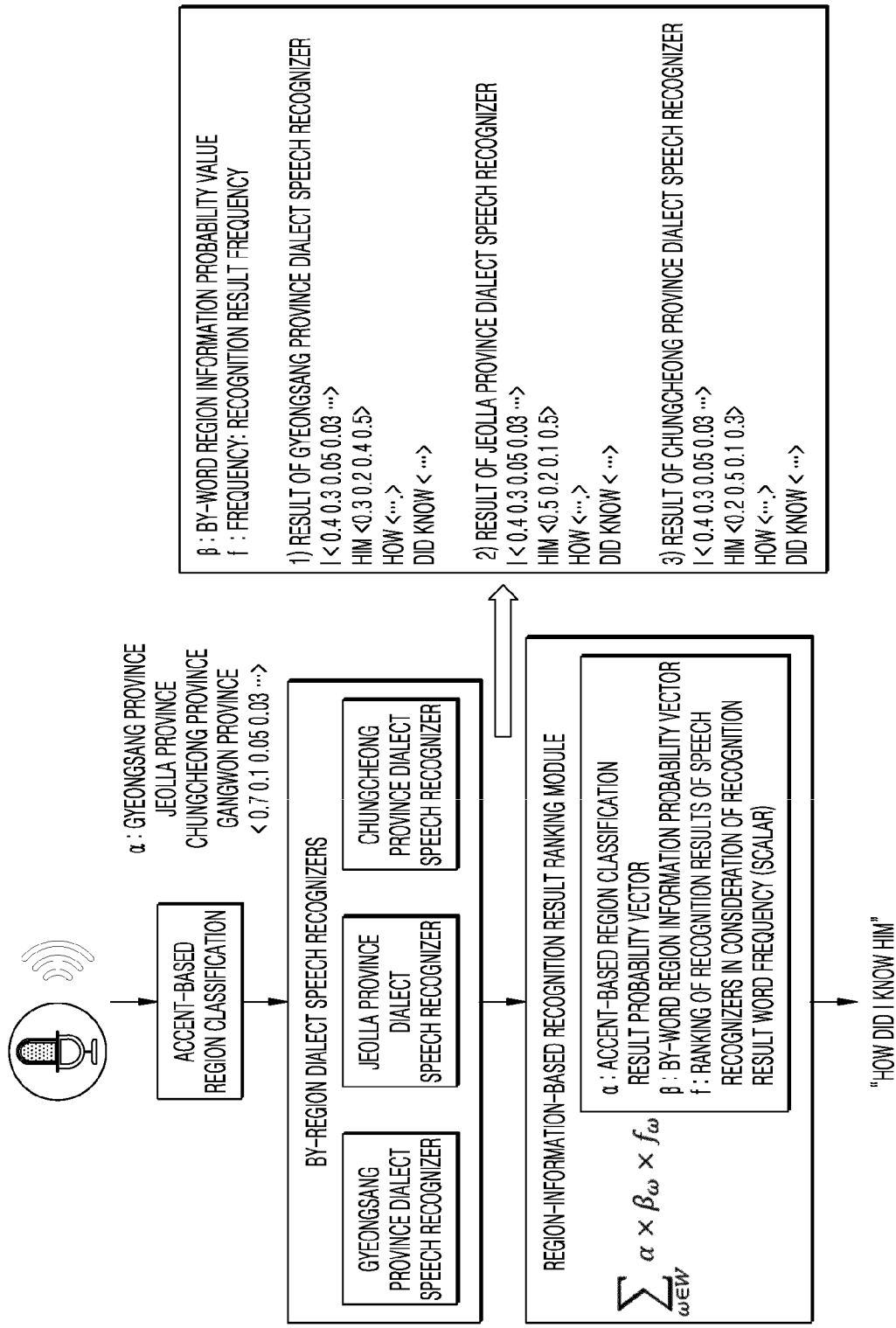
FIG. 6 is an illustrative diagram of a speech recognition method according to another embodiment of the present disclosure.

FIG. 6 is an illustrative diagram of a speech recognition method according to another embodiment of the present disclosure.

Referring to FIG. 6, a speech recognition method using regional dialect speech recognizers is illustrated.

Through the region classifier 511, the speech recognition system 500 may classify a region in which input speech is used based on accent. For example, the speech recognition system 500 may classify a region by determining whether the input speech is in Gyeongsang Province dialect, Jeolla Province dialect, Chungcheong Province dialect, or Gangwon Province dialect based on the accent of the input speech.

The speech recognition system 500 may recognize input speech in parallel using by-region dialect speech recognizers.

The speech recognition system 500 may rank region-information-based recognition results through the recognition result selector 550.

Finally, the speech recognition system 500 may select the result of speech recognition by the speech recognizer that has received the highest score through the recognition result selector 550.

The region-information-based recognition result ranking module may rank the results of speech recognition by the respective speech recognizers in consideration of an accent-based region classification result probability vector, a by-vocabulary region information probability vector, and the number of recognition results.

According to embodiments of the present disclosure, as described above, it is possible to discriminate a region based on analysis of an accent in uttered speech and to collect speech and text data by region, whereby it is possible to construct an acoustic model and a language model.

In addition, it is possible to utilize an acoustic model and a language model having regional characteristics reflected therein in speech recognition, whereby it is possible to improve performance of speech recognition.

In addition, it is possible to rank the results of the speech recognizers through operation thereof in parallel using an accent in speech of a speaker and information about vocabulary having regional characteristics used in the speech, whereby it is possible to select the optimal result of speech recognition.

Embodiments of the present disclosure described above may be implemented in the form of computer programs that may be executed through various components on a computer, and such computer programs may be recorded in a computer-readable medium. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A regional-features-based speech recognition method, comprising:

learning speech features by region using speech data classified by region category; and recognizing, by a speech recognition device, input speech using an acoustic model and a language model generated through classification of a region category for the input speech and the learning, wherein the recognizing the input speech comprises:

inputting the input speech into a plurality of by-region speech recognizers using the acoustic model and by-region language models, each of the plurality of by-region speech recognizers corresponding to a different regional dialect;

generating output results based on the input speech by each of the plurality of by-region speech recognizers;

generating a prediction of a region category corresponding to the input speech based on probability values assigned to the output results based on an accent of the input speech, a characteristic word by region, and a number of times that the characteristic word is used in a speech recognition process; and selecting a speech recognition result output by a by-region speech recognizer among the plurality of by-region speech recognizers that has received a highest score according to the prediction, wherein the learning speech features by region further comprises training the language model based on a corpus collected by region, wherein the training the language model comprises performing region information vector labeling by word with respect to words included in the corpus collected by region, wherein the training the language model comprises performing vector labeling in which, with respect to a word frequently used by region, a value of information of a corresponding region is set to be high, and wherein the generating the prediction of the region category comprises ranking outputs of the plurality of by-region speech recognizers based on an accent of the input speech, a word included in the input speech and having regional characteristics, and a number of times that the word is used.

2. The regional-features-based speech recognition method according to claim 1, wherein the learning speech features by region comprises classifying speech features by region category based on accent.

3. The regional-features-based speech recognition method according to claim 1, wherein the learning speech features by region comprises generating a region classification learning model using extracted speech features.

4. The regional-features-based speech recognition method according to claim 2, wherein the learning speech features by region further comprises training the acoustic model using the classified speech features.

5. The regional-features-based speech recognition method according to claim 1, wherein the recognizing the input speech is performed in parallel by the plurality of by-region speech recognizers.

6. The regional-features-based speech recognition method according to claim 1, further comprising:

ranking the plurality of by-region speech recognizers based on a sum of an accent-based region classification result probability vector, a by-word region information probability vector and a scalar value based on a recognition result word frequency.

7. The regional-features-based speech recognition method according to claim 1, wherein the plurality of by-region speech recognizers include two or more of a British English speech recognizer, an American English speech recognizer, an Australian English speech recognizer and an Irish English speech recognizer.

8. A regional-features-based speech recognition system, comprising:
 a learning processor configured to learn speech features by region using speech data classified by region category; and
 a speech recognizer configured to recognize input speech using an acoustic model and a language model generated through classification of a region category for the input speech and the learning,
 wherein the speech recognition system is further configured to:
  input the input speech into a plurality of by-region speech recognizers using the acoustic model and by-region language models, each of the plurality of by-region speech recognizers corresponding to a different regional dialect,
  generate output results based on the input speech by each of the plurality of by-region speech recognizers,
  generate a prediction of a region category corresponding to the input speech based on probability values assigned to the output results based on an accent of the input speech, a characteristic word by region, and a number of times that the characteristic word is used in a speech recognition process, and
  select a speech recognition result output by a by-region speech recognizer among the plurality of by-region speech recognizers that has received a highest score according to the prediction,
 wherein the learning processor further comprises a language model learning processor configured to train the language model based on a corpus collected by region,
 wherein the language model learning processor performs region information vector labeling by word with respect to words included in the corpus collected by region,
 wherein the language model learning processor performs vector labeling in which, with respect to a word frequently used by region, a value of information of a corresponding region is set to be high, and
 wherein the regional-features-based speech recognition system ranks outputs of by-region speech recognizers using a region classification result probability vector based on an accent of the input speech, a word included in the input speech and having regional characteristics, and a number of times that the word is used, a region information probability vector by word having regional characteristics, and a scalar value of the number of times.

9. The regional-features-based speech recognition system according to claim 8, wherein the learning processor comprises a region classification learning processor configured to classify speech features by region category based on accent.

10. The regional-features-based speech recognition system according to claim 9, wherein the region classification learning processor generates a region classifier configured to classify speech features extracted by region category based on accent.

11. The regional-features-based speech recognition system according to claim 9, wherein the learning processor further comprises an acoustic model learning processor configured to train the acoustic model using the classified speech features.

12. The regional-features-based speech recognition system according to claim 8, wherein the speech recognizer comprises by-region speech recognizers configured to recognize speech in parallel.

* * * * *